Aug. 6, 1968    F. LANG ET AL    3,395,517
DUST REMOVABLE DEVICE

Filed Aug. 16, 1965    3 Sheets-Sheet 1

Aug. 6, 1968   F. LANG ETAL   3,395,517
DUST REMOVABLE DEVICE
Filed Aug. 16, 1965   3 Sheets-Sheet 3

United States Patent Office 3,395,517
Patented Aug. 6, 1968

3,395,517
DUST REMOVABLE DEVICE
Franz Lang, Schulstrasse 1, Lissberg, Germany, and Wilfried Sittner, Muhlstrasse 5, Merkenfritz, Germany
Filed Aug. 16, 1965, Ser. No. 493,294
7 Claims. (Cl. 55—285)

ABSTRACT OF THE DISCLOSURE

Dust filter arrangement in which nozzles clean line of filter elements while rotating through a certain angle and then are removed to the next line of filter elements to clean the same.

This invention relates to dust removal devices for gases.

It is known to clean the filter elements of dust removal devices charged by dust containing gas from the outside, by means of short currents of oppositely flowing air. Some dust removal devices may consist, for example, of cylindrical or square-shaped containers into which the filter elements are built. The filter elements used are mostly filter hoses which have an open end fixed to a perforated bottom which is located in the upper portion of the container. The lower portion of the container is generally conical and comprises a dust discharge member which is, for example, a worm, and a discharge opening which is closed, for example, by a bucket wheel gate or valve. Located above the upper perforated bottom are nozzle openings, each of which is arranged above the center of a hose, and which are connected to a compressed-air line. At specific intervals, air current pulses issue from said nozzles, either for each hose separately or, in case of larger units, in rows. The pulses are controlled by an electric or pneumatic timer.

The number of filter hoses and, hence, the width and the length of the container and the length of the hoses as well as the height of the housing depend on the filtering area required. The filter elements must be designed in such a manner that they withstand the pressure of the filter resistance. The construction depends on whether the elements are charged from the outside or from the inside. Normally, a filter element consists of a basket, over which the filter material is pulled. If several rows of such elements are built into the container, the rear elements can be disassembled through a door in the container, if the front elements have been disassembled first, except if mounting openings for almost the entire hose length are provided on the entire circumference of the container. However, in the latter case the expenditure for the sealing is high.

It is one of the problems to be solved by the present invention that the desired filtering areas or surface is obtained in that the housing is changed only in one direction of extension while the other dimensions remain the same, i.e., that the housing is adapted to the filtering area, in which case it is possible to exchange the filter elements, independently of each other, separately, through a comparatively small door. This produces advantages as far as production is concerned.

The invention thus relates, on the one hand, to a dust removal device with filter elements extending radially from a rotatable drum and such a device is characterized, according to the invention, in that the drum chamber is located on the pure-gas side, that one of its fronts or faces is closed and that its open front or face is connected to the pure gas discharge opening of the filter housing surrounding the drum. This development may provide for a comparatively narrow door, which extends over the entire length of the drum and which gives successive access to all filter elements for assembly and disassembly.

The dust removal device with means for the cleaning of filter elements by compressed air or suction acting briefly on each element is further characterized in that the elements can successively be moved past suction or compressed-air nozzles. This arrangement is particularly advantageous in a dust removal device having filter elements extending radially from a rotatable drum, wherein the drum chamber is located on the pure gas side, one front of the drum is closed and the open front is connected to the pure gas discharge opening of the filter housing surrounding the drum.

Thus, the drum serves preferably as a discharge duct for pure gas. In the bottom portion of the preferably cylindrical housing, the housing chamber tapers to a dust collecting worm. Provided within the rotatable drum, expediently in the vertical axis are nozzles, whose axial distance is such that the row of nozzles coincides with a row of the filter elements. The drum is rotated slowly or is operated or indexed intermittently so that all filter elements pass the direction of the jets of the nozzles. Air jet pulses or a permanent jet are passed continuously or periodically over the spray nozzles, thereby causing the dust to drop off.

Various motions may be considered for the drum and the cleaning nozzles. For example, the drum may be rotated uniformly, while the nozzles execute a temporally limited pivoting motion at the same angular speed and direction as the drum. The nozzles move with the rotation of the drum, until the following row of filter elements has reached the lower vertical position, whereupon the nozzles return to their starting positions. This avoids frequent acceleration of the drum mass in case of large filters or drums.

The filter elements may consist of cylindrical baskets covered with a filtering material or of circular pockets whose fronts or faces are covered over with filter cloth. If disc-shaped pockets are used, the cleaning may be effected, in an even stronger manner, by means of two air currents, first, from the inside of the pocket by compressed air and, secondly, from the outside of the pocket by blast or suction nozzles. The latter may either be stationary or may be arranged so as to be movable in the range of the radius of the filter surfaces.

The invention will now be explained in respect of two embodiments with reference to the accompanying drawing, in which.

Figure 1:
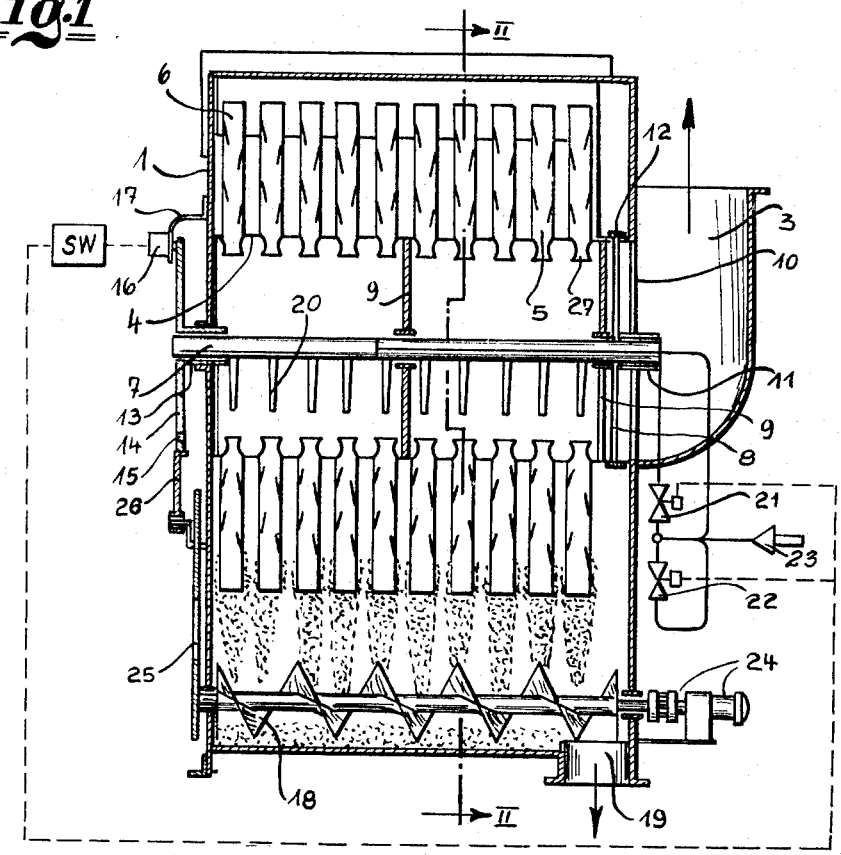
FIGURE 1 shows a longitudinal section of a filter device according to the invention, with cylindrical filter elements or cells.
Figure 2:
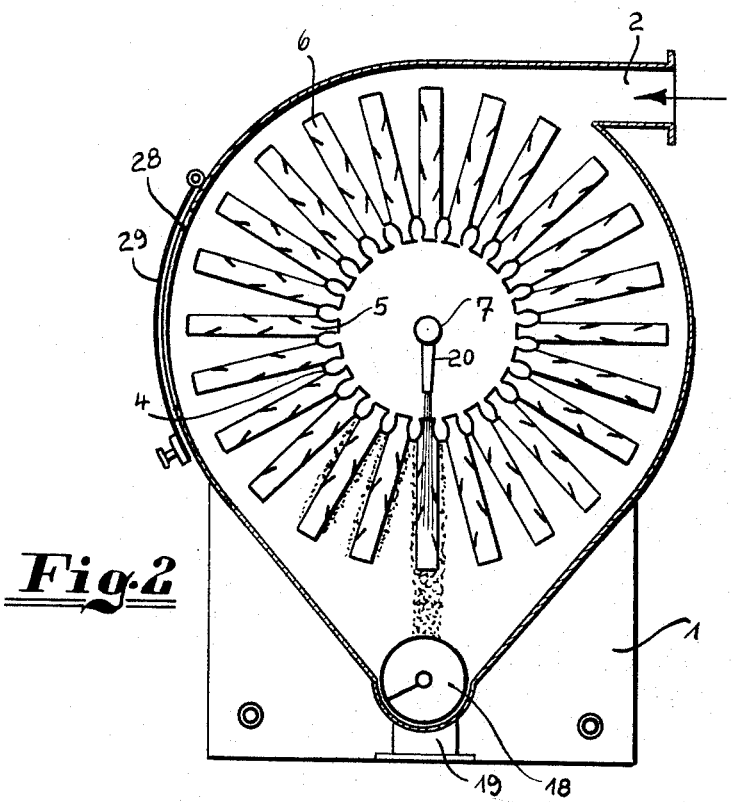
FIGURE 2 is a cross-section through the device according to FIG. 1, approximately along line II—II of FIG. 1.

The device illustrated in FIGS. 1 and 2 consists of a closed housing 1 having an inlet opening 2 for supplying the dust-laden gas which is to be cleaned, and having an outlet opening 3 for the purified gas. Positioned in the closed, substantially cylindrical housing is a drum 4, whose jacket is provided with rows of apertures 5, into which are inserted radially extending, substantially cylindrical filtering baskets 6 which are covered with a filtering medium such as a filter cloth. The drum 4 is rotatably mounted on an axle or shaft 7 supported in the front walls of the housing 1. The end 8 of the drum which is on the right in the drawing is open; it has no front wall. The drum is supported by the shaft 7 by way of the spokes 9, The right front face of the housing 1, which covers the area of the cross-section of the drum, is also open; the front wall projects into said opening merely with arms or spokes 10, which hold the right bearing 11 of the shaft 7 at that place. The gap which may remain between the right edge of the drum and the housing is sealed by means of a collar 12 or by other conventional means.

The left end of the drum is extended to form a tubular socked opening, whose outside is acted on by the journal bearing of the housing wall, so that the tubular socket opening is positioned between the shaft 7 and the front wall of the housing, i.e., in the final analysis, the housing wall carries the shaft. A toothed wheel 14 is rigidly connected to the tubular socket 13 The wheel or disc 14 comprises, on a circumference adjacent the outer edge, a number of bores 15 which cooperate with an end switch 16 mounted on a frame or bow-shaped member 17 which is secured to the housing 1.

Positioned in the lower portion of the housing is a dust collecting worm or spiral conveyor 18. The dust discharge opening 19 is located on the right side of the housing. Said opening is closed by a bucket wheel gate or valve (not shown).

The shaft 7 consists of a tube. Nozzles 20 extend radially from the tube at intervals which correspond to the axial intervals of the filtering baskets 6, the tube thereby constituting a manifold for said nozzles. The centers of these nozzles are arranged in a row and coincide with the centers of the respectively opposite filtering baskets 6 of the lowermost row. The tubular shaft 7 is connected to a source of compressed air 23 by way of a control or pilot valve or by way of several control or pilot valves 21 and 22.

A gear motor 24 drives, preferably by way of a coupling, the spiral conveyor 18 from whose free left end a chain drive 25 is derived. Said chain drive acts, by way of a rocker arm 26, on the wheel 14, in such a manner that the drum is rotated intermittently.

The dust-laden gas is blown into the filter through the tubular opening or socket 2 or, if the blower is sequentially connected (arranged beyond the filter), the gas is sucked through the said opening 2. The dust is deposited on the filter cloth, while the gas flow through the cloth and is conducted through the drum 4 and the outlet 3 into the open or, in case of suction plants, to the blower.

By way of the gear motor 24, the spiral conveyor 18, the chain drive 25, the rocker arm 26 and the wheel 14, the drum 4 is intermittently rotated row-by-row of baskets, so that the drum executes a revolution, preferably within 5 to 10 minutes, depending on the amount of dust gathered. While the rocker arm moves back and the drum thereby stops, the lowermost row of filter hoses or baskets is cleaned by the oppositely located nozzles from which several short air current pulses issue. This process is controlled by the end or limit switch 16. One row of baskets is associated with each of the bores 15. When a bore arrives in front of the limit switch, the latter makes contact with and actuates a switching device SW which consists of three adjustable time-lag relays (not shown) for setting the number of pulses, the pulse time and the total time.

The air current is allowed to pass, according to program, by way of one or more control or pilot valves, for example, magnetic valves. The total time of a series of pulses must always be shorter than the return time of the rocker arm.

The open ends of the filtering baskets 6, which are inserted into the drum, are developed as Venturi nozzles 27. The comparatively high velocity in the blast nozzle 20 produces in the Venturi nozzle 27 a vacuum, through which a large amount of the purified gas is sucked for flowing back and rinsing or flushing. The dust drops into the chamber below the drum and is discharged by the spiral conveyor 18 through the opening 19.

The filtering baskets are accessible through an opening 28 in the longitudinal wall of the housing. Said opening can be closed tightly by a sliding closure 29.

Owing to the construction selected, the housing can be sealed readily. The filter elements used may advantageously be filtering candles on porous material, such as, for example, sintered metal, plastics, specifically low-pressure polyethylene, and the like. In relation to the filter surface unit, the filter elements can be subjected to great load and can be operated as suction, pressure, high-pressure and vacuum filters.

Figure 3:
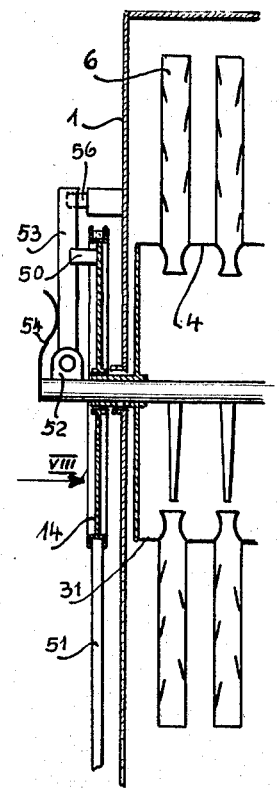
FIGURE 3 shows a partial sectional view, substantially corresponding to FIG. 1, through a filter device according to the invention with the view of a step-by-step operating or control mechanism.
Figure 4:
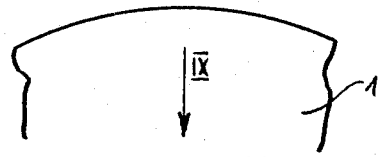
FIGURE 4 shows a simplified view of the step-by-step mechanism, which is a top view of FIG. 3 in the direction of the arrow VIII.
Figure 5:
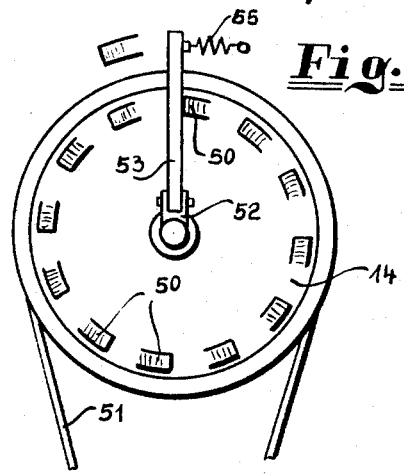
FIGURE 5 is a simplified view of the step-by-step mechanism according to FIGS. 3 and 4 seen in the direction of the arrow IX.
Figure 5:
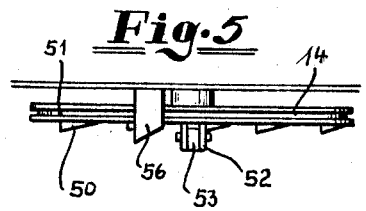

FIGS. 3–5 illustrate a device which permits imparting to the tubular shaft or manifold 7 and, thereby, to nozzle tubes 20 fixed thereon, an intermittent oscillating motion, i.e., a swinging or pivoting motion. The tube 7 is rotatably positioned about its axis. The pulley in FIG. 3, which may be developed in the same manner as the corresponding disc 14 in FIG. 1 and therefore has the same reference numeral, carries, on a circumference, driving teeth 50, which are developed like sawteeth, i.e., which have an inclined surface on one side. Outside the housing 1 and the pulley 14 driven by a belt 51, a small bearing block 52 is mounted on the circumference of the tube 7, a driving lever 53 being articulately connected to said bearing block. The lever is pressed into the path of motion of the teeth 50 by a leaf spring 54 fixed on the tube 7, so that the lever is taken along by a tooth 50 when the disc 14 rotates. The lever is driven in this manner against the force of a tension spring 55, whose ends are secured to the housing 1 or to the lever 53, as shown in FIG. 4. Also extending from the housing 1 is a ride-up cam 56, on which the end of the lever 53 rides up when the lever is driven by a tooth 50, and is thereby removed from (lifted out of) the range of engagement of the driving tooth. When the lever has thus been lifted (out of engagement), it snaps back due to the force of the spring 55, counter to the direction of rotation, until it is engaged by the next tooth and is driven again, so that the operation is repeated. The tube 7 must necessarily take part in this motion of slowly moving in the direction of rotation of this drum and of the intermittent snapping back, so that the nozzles accompany the filter elements charged by them for the length of the pivoting or swinging path provided, whereupon they are moved very quickly in front of the next row of filter elements. In this arrangement, the filter elements are charged briefly, although the interior of the tube 7 is or may be continuously under pressure of compressed air.

Instead of using the cleaning nozzles 20, tubes may be provided which comprise a plate with packing to cover the opening of the filter elements and which are sealingly pressed against the opening during an interval of motion by way of two lifting cylinders respectively, whereby a pulsating air current is switched on. The term "intervals" means, in this case, the stopping of the relative motion between the tubular shaft 7 and the drum.

In addition, it is possible to subdivide the drum lengthwise into air-tight sectors corresponding to the rows of filters and to cover a part of the sectors, for example, three sectors, with a plate. It is advisable that the covering be effected in the round cross-section of the pure gas outlet opening of the housing. The pure air pressure line of the pulsating cleaning air current is conected to the center of the cover plate. If this arrangement is used, the cleaning nozzles 20 may even be dispensed with. Thus, there are different possibilities for cleaning the filter surface which can be adapted to prevailing circumstances, in according with the invention.

What is claimed is:

1. A multiple-unit dust filter for backwash operation comprising a rotatable drum, closed at one end and open at the other end, means for driving the drum in rotation, filter elements distributed circumferentially and in axial lines on the outside of the drum, said drum being provided with apertures connecting the interior of said drum with the interior of said filter elements, said apertures thereby being in lines which are angularly spaced around said drum, a housing enclosing said drum and said filter elements, said housing being provided with an opening for the entrance of dust laden air or gas, said opening in the housing being external of the filter elements, the open end of said drum forming an outlet for clean air or gas resulting from the passage of the dust laden air or gas through the filter elements, said housing having an outlet opening connected with the open end of the drum for the external discharge of the clean air or gas from the housing, a hollow tube in said housing for connection with a source of gas under pressure, said tube being coaxial with the drum, nozzles arranged in line on said tube in correspondence with said apertures and connected to said pressure gas by said tube, said nozzles facing the filter elements and means for rotating said tube and thereby said nozzles in the same direction and at the same rate of rotation as the drum and means for returning the tube rapidly after the nozzles have accompanied a line of filter elements and said apertures through a given amount of rotation so that the nozzles are in line with a successive row of filter elements.

2. A filter as claimed in claim 1 comprising bearing means on the housing for supporting said tube and bearing means on the drum for supporting the same on said tube.

3. A filter as claimed in claim 1 comprising valve means controlling the flow of gas from said source.

4. A filter as claimed in claim 1 wherein the nozzles are spaced from the drum.

5. A fiilter as claimed in claim 1 wherein said apertures constitute, at least in part, Venturi orifices.

6. A filter as claimed in claim 1 wherein said means includes a wheel, a plurality of angularly spaced teeth on said wheel, an arm on said tube and in a position to be driven by one of said teeth, means to displace said arm from said position, and means to move the thusly displaced arm to the next adjacent tooth.

7. A filter as claimed in claim 3 wherein the valve means is constructed as a control valve located between said tube and the source of gas under pressure, and means coupled to said control valve for actuating same for releasing short bursts of gas while the nozzles are accompanying a line of filters.

References Cited

UNITED STATES PATENTS

| | | | |
|---|---|---|---|
| Re. 24,521 | 8/1958 | Young | 55—293 X |
| 403,798 | 5/1889 | Trautmann | 55—286 |
| 727,439 | 5/1903 | Prinz | 55—285 |
| 1,235,581 | 8/1917 | McHugh | 55—285 X |
| 2,474,478 | 6/1949 | Hartz | 55—290 |
| 2,516,680 | 7/1950 | Culpepper | 55—294 X |
| 2,591,198 | 4/1952 | Ringe | 55—294 |
| 2,594,957 | 4/1952 | Martens | 55—294 |
| 2,804,168 | 8/1957 | Church | 55—302 |
| 2,867,288 | 1/1959 | Turner | 55—484 X |
| 2,954,873 | 10/1960 | Davis | 55—302 X |
| 3,045,409 | 7/1962 | Kronstad | 55—285 |
| 3,147,098 | 9/1964 | Honan et al. | 55—294 |
| 3,178,868 | 4/1965 | Gibby | 55—293 X |
| 3,183,647 | 5/1965 | Lang | 55—294 X |

FOREIGN PATENTS

| | | |
|---|---|---|
| 40,125 | 7/1887 | Germany. |
| 488,717 | 1/1930 | Germany. |

HARRY B. THORNTON, *Primary Examiner.*

BERNARD NOZICK, *Assistant Examiner.*